(12) United States Patent
Ishibashi

(10) Patent No.: US 9,423,613 B2
(45) Date of Patent: Aug. 23, 2016

(54) VEHICLE DISPLAY DEVICE WITH LINEARLY RETRACTAABLE REFLECTION PLATE

(71) Applicant: Yazaki Corporation, Tokyo (JP)

(72) Inventor: Shuichi Ishibashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 200 days.

(21) Appl. No.: 13/863,644

(22) Filed: Apr. 16, 2013

(65) Prior Publication Data

US 2013/0279015 A1    Oct. 24, 2013

(30) Foreign Application Priority Data

Apr. 23, 2012    (JP) .................................. 2012-097543

(51) Int. Cl.
| | | |
|---|---|---|
| G02B 27/14 | (2006.01) | |
| G02B 27/01 | (2006.01) | |
| B60K 35/00 | (2006.01) | |
| B60K 37/02 | (2006.01) | |

(52) U.S. Cl.
CPC ............ G02B 27/0101 (2013.01); B60K 35/00 (2013.01); B60K 37/02 (2013.01); G02B 27/0149 (2013.01); *B60K 2350/2052* (2013.01); *B60K 2350/405* (2013.01); *G02B 2027/0156* (2013.01)

(58) Field of Classification Search
CPC ............ G02B 27/017; G02B 27/0149; G02B 27/0178; G02B 27/0101; G02B 27/0172
USPC .......................................................... 359/630
See application file for complete search history.

(56) References Cited

U.S. PATENT DOCUMENTS 5,204,666 A    4/1993  Aoki et al.
7,869,129 B2    1/2011  Lebreton

FOREIGN PATENT DOCUMENTS

DE    10220181 A1    11/2002
JP    09-127456 A    5/1997

OTHER PUBLICATIONS

Office Action dated Jan. 22, 2014, issued for the German patent application No. 10 2013 207 136.1 and English translation thereof.

*Primary Examiner* — Bumsuk Won
*Assistant Examiner* — Tamara Y Washington
(74) *Attorney, Agent, or Firm* — Locke Lord LLP; James E. Armstrong, IV; Brian S. Matross

(57) ABSTRACT

Provided is a vehicle display device including a base to be mounted to a vehicle, a reflection plate which protrudes from and retracts in the base, a projection unit for projecting a display image on the reflection plate, a cover body covering a front portion in a protruding direction of the retracted reflection plate, a drive unit provided to the base for driving the reflection plate to protrude and retract, a holding member holding the reflection plate and connected to the drive unit to be driven linearly, and a posture maintenance unit provided across the holding member and the base to maintain a posture of the reflection plate. The reflection plate is moved to protrude and retract along a movement plane tilted in the protruding direction toward an eye-point with respect to an orthogonal plane orthogonal to a direction of line of sight of a driver to the reflection plate.

9 Claims, 9 Drawing Sheets

ID AND LINEARLY RETRACTAABLE REFLECTION PLATE

VEHICLE DISPLAY DEVICE WITH LINEARLY RETRACTAABLE REFLECTION PLATE

TECHNICAL FIELD

The present invention relates to a vehicle display device which is mounted on an instrument panel of an automobile or the like to display information such as vehicle information and navigation information.

BACKGROUND ART

Conventionally, there are many vehicle display devices arranged to allow a passenger (a driver) to visibly recognize various information such as navigation information superposed on an exterior landscape. An example of such vehicle display device is disclosed in Japan Patent Application Publication No. H09-127456.

As shown in FIG. 12, the conventional vehicle display device 101 mentioned above includes an irradiation device (not shown) which radiates display light, a combiner (a reflector) 103 having a reflection face 130 for reflecting the display light, and a support mechanism provided at a lower end portion of the combiner 103 to rotatably support the combiner 103 from a folded state (i.e. a housed position) to a standing state (i.e. an unfolded position). In this vehicle display device 101, the combiner 103 is placed to stand up on an upper face of an instrumental panel P of a vehicle such that the display light from the irradiation device housed within the instrumental panel P is reflected on the reflection face 130 to produce an image on the reflection face 130 to allow a passenger (a driver) to visually recognize various information such as navigation information.

SUMMARY OF INVENTION

Problem to be Solved

However, the above-mentioned conventional vehicle display device 101 has a drawback that, during the rotation of the combiner 103 from the folded state to the standing state or from the standing state to the folded state, the combiner 103 is tilted with facing upward with respect to the upper face of the instrumental panel P. In this state as shown in FIG. 12, external light L2 (e.g. room lamp light) other than the display light may reflect on the reflection face 130 of the combiner 103, causing the driver to feel bright.

In view of the above-mentioned drawback, an object of the present invention is to provide a vehicle display device which can prevent a driver from feeling bright by preventing external light from being reflected on a reflection plate.

Solution to Problem

In order to achieve the above-described object, the present invention provides, in a first aspect, a vehicle display device including: a base to be mounted to a vehicle; a reflection plate arranged to protrude upward from the base and to retract in the base; a projection unit arranged to project a display image on the reflection plate; a cover body arranged to cover a front portion in a protruding direction of the reflection plate retracted in the base; a drive unit provided to the base and arranged to drive the reflection plate to protrude and retract; a holding member arranged to hold the reflection plate and connected to the drive unit to be driven in a linear fashion; and a posture maintenance unit provided across the holding member and the base to maintain a posture of the reflection plate, wherein the reflection plate is moved to protrude and retract along a movement plane which is tilted in the protruding direction toward a driver's eye point with respect to an orthogonal plane which is orthogonal to a direction of a line of sight of a driver to the reflection plate.

The present invention provides, in a second aspect, the vehicle display device according to the first aspect, wherein the posture maintenance unit includes: a rack provided to the base and having a plurality of teeth; a guide groove provided to the base along the rack; a gear rotatably supported by the holding member and having a tooth which engages with the rack; and a pin protruded from the holding member and arranged to be guided by the guide groove.

The present invention provides, in a third aspect, the vehicle display device according to the second aspect, wherein the guide groove is located closer to the projection unit than the rack, and the pin is located closer to the projection unit than the gear.

The present invention provides, in a fourth aspect, the vehicle display device according to the second or the third aspect, wherein the posture maintenance unit further includes: a guiding portion provided to the base and located adjacent to the rack; and a rolling roller rotatably supported by the holding member and arranged to roll along the guiding portion.

The present invention provides, in a fifth aspect, the vehicle display device according to any one of the preceding aspects, wherein the posture maintenance unit further includes a guide roller which is rotatably supported by the holding member and arranged to roll on the base.

Advantageous Effects of Invention

According to the invention described in the first aspect, the reflection plate is moved to protrude and retract along a movement plane which is tilted in the protruding direction toward a driver's eye point with respect to an orthogonal plane which is orthogonal to a direction of a line of sight of a driver to the reflection plate. Thus, the reflection plate moves up and down in the forward-tilted posture (i.e. tilted toward a driver) with respect to the orthogonal plane which is orthogonal to the direction of the line of sight from the eye point, thereby preventing external light from being reflected on the reflection plate.

According to the invention described in the second aspect, the posture maintenance unit includes a rack provided to the base and having a plurality of teeth, a guide groove provided to the base along the rack, a gear rotatably supported by the holding member and having a tooth which engages with the rack, and a pin protruded from the holding member and arranged to be guided by the guide groove. Thus, the holding member can be guided along the direction in which the rack extends in a reliable manner. Furthermore, since the gear is arranged to roll on the rack in engagement with the rack, the frictional resistance between the gear and the rack can be reduced compared to a gear which is not arranged to roll on the rack. As a result, the drive force of the drive unit can be set small.

According to the invention described in the third aspect, the guide groove is located closer to the projection unit than the rack, and the pin is located closer to the projection unit than the gear. Thus, the pin abuts on the widthwise end of the guide groove and thereby prevents the gear from separating from the rack, thereby maintaining a good engagement condition of the gear and the rack.

According to the invention described in the forth aspect, the posture maintenance unit further includes a guiding portion provided to the base and located adjacent to the rack, and a rolling roller rotatably supported by the holding member and arranged to roll along the guiding portion. Thus, the holding member can be guided in the direction in which the rack extends in an even more reliable manner. The rolling roller abuts on the widthwise end of the guiding portion and thereby prevents the gear from separating from the rack, thereby maintaining an even more good engagement condition of the gear and the rack.

According to the invention described in the fifth aspect, the posture maintenance unit further includes a guide roller which is rotatably supported by the holding member and arranged to roll on the base. Thus, the guide roller is arranged to roll on the base while being pushed against the base, thereby preventing the backlash of the holding member. Furthermore, the frictional resistance between the holding member and the base can be reduced compared to a guide roller which is not arranged to roll on the base. As a result, the drive force of the drive unit can be set even smaller.

DESCRIPTION OF EXEMPLARY EMBODIMENTS

Figure 1:
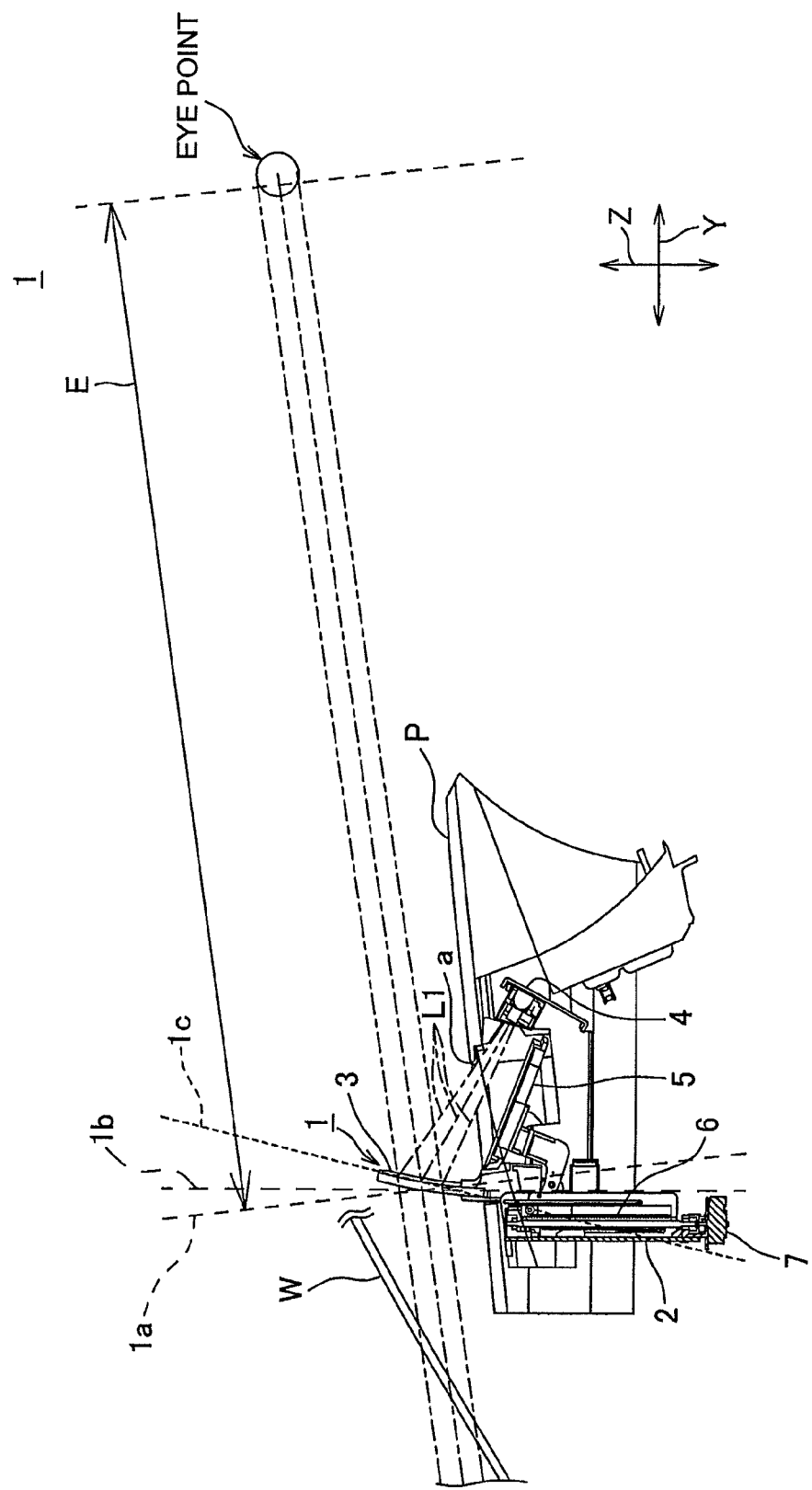
FIG. 1 is a cross-sectional view showing a room interior of a vehicle provided with a vehicle display device according to one embodiment of the present invention and showing the vehicle display device in an in-use state.

In the following, one embodiment of a vehicle display device (thereinafter called "HUD device") according to the present invention in reference to FIG. 1 through FIG. 11.

A vehicle is provided with a front windshield W arranged at a vehicle front in a room interior and an instrumental panel P arranged at a lower side of the front windshield W.

The instrumental panel P is made of black synthetic resin and such and is provided with a HUD device 1 and various operation switches not shown and such. An upper face of the instrumental panel P is matted and is provided with an opening "a" located at a front portion of a driver's sheet at the upper face of the instrumental panel P for passing a reflection plate 3 of the HUD device 1, as shown in FIG. 1.

The HUD device 1 is arranged to display a display image which indicates information such as vehicle information and navigation information. Furthermore, as shown in FIG. 1 and FIG. 2, the HUD device 1 includes a base 2 to be attached to an automobile (a vehicle), the reflection plate 3 capable of protruding from the base 2 (i.e. from the upper face of the instrumental panel P) and retracting in the base 2, a projection unit 4 arranged to project the display image to the reflection plate 3, a cover body 5 covering a front portion in a protruding direction of the reflection plate 3 retracted in the base 2, a posture maintenance unit 6 arranged to maintain the posture of the reflection plate 3 to be along a retracting and protruding direction, and a drive unit 7 for driving the reflection plate 3 to protrude and retract.

Figure 2:
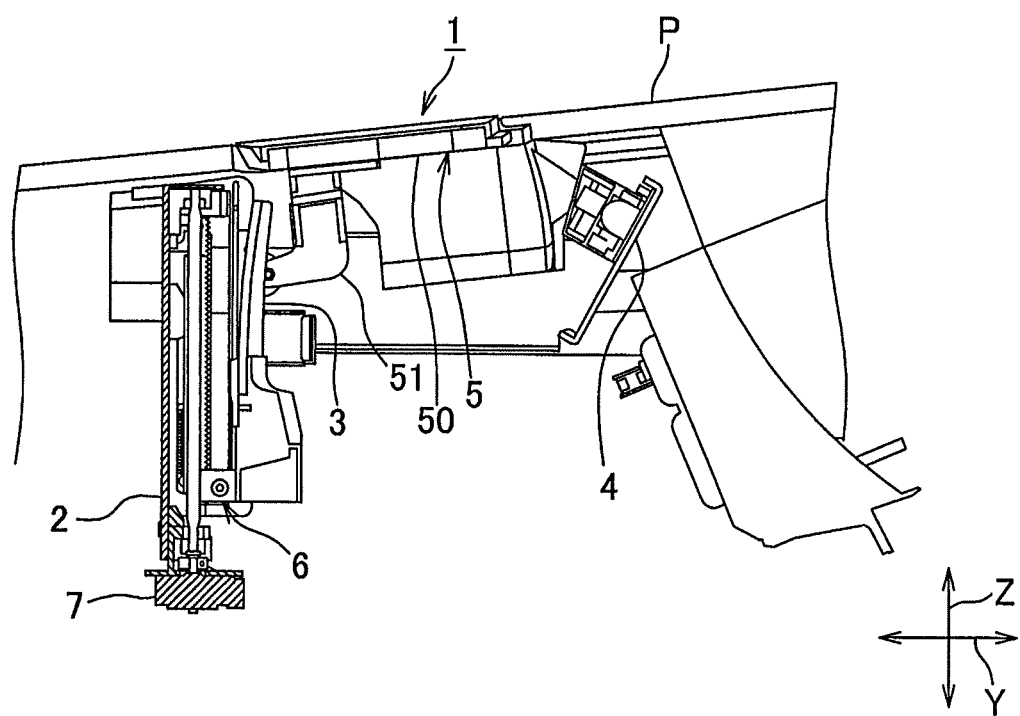
FIG. 2 is a cross-sectional view showing the vehicle display device shown in FIG. 1 in a non-use state.

Herein, as shown in FIG. 1, the retracting and protruding direction is a direction parallel to a movement plane 1$b$, an upper side of the movement plane 1$b$ being tilted toward a driver's side with respect to an orthogonal plane 1$a$ which is orthogonal to a direction E of a line of sight of the driver. That is, the retracting and protruding direction corresponds to an up-and-down direction with respect to the vehicle and thus corresponds to a Z direction indicated by an arrow Z in FIG. 1. A Y direction indicated by an arrow Y in FIGS. 1 and 2 indicates a front-and-back direction of the vehicle. An X direction indicated by an arrow X in FIG. 3 and such indicates a direction which intersects the Y direction and the Z direction, i.e. a left-and-right direction of the vehicle. Herein, the expression of up, down, upper and lower is used with respect to the above-mentioned up-and-down direction, i.e. the Z direction, unless otherwise noted.

The reflection plate 3 shown in FIG. 1 is arranged along a tilted plane 1$c$ which is tilted further toward the driver's side than the movement plane 1$b$. The reflection plate 3 is moved to retract and protrude along the retracting and protruding direction (i.e. the Z direction), and after that, an angle of the reflection plate 3 is adjusted by a later-described positioning member 9 to lie along the tilted plane 1$c$.

Figure 3:
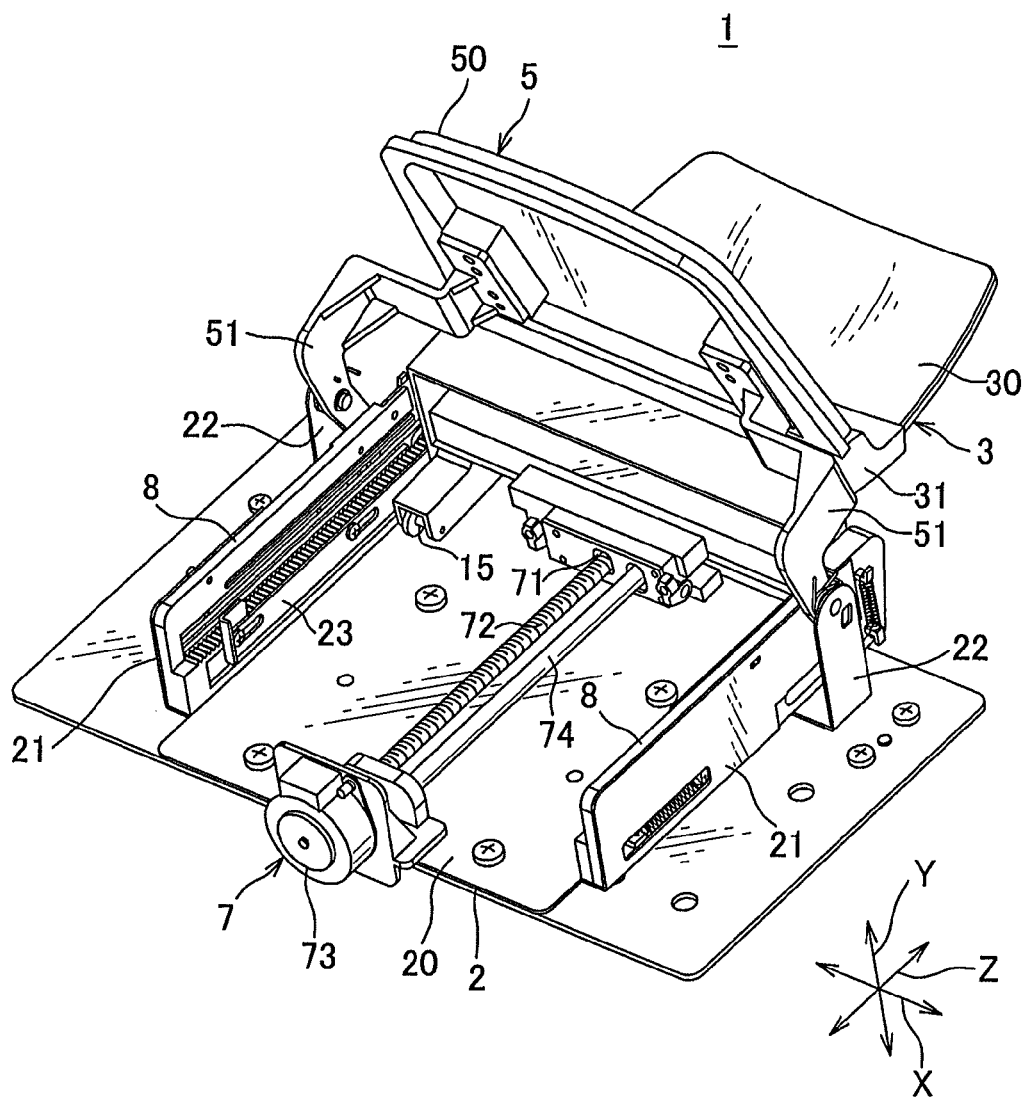
FIG. 3 is a perspective view showing the vehicle display device shown in FIG. 1.

As shown in FIG. 3, the base 2 includes a rectangular plate-shaped board 20, a pair of plate mount portions 21 for mounting each of a pair of plates 8 described later, a pair of cover body mount pieces 22 for mounting the cover body 5, and a pair of interlock members 23 supported at an inner side of the pair of plates 8 so as to move in the up-and-down direction (i.e. the Z direction), respectively. The board 20 is arranged such that a longitudinal direction of the board 20 lies along the up-and-down direction (i.e. the Z direction), and a thickness direction of the board 20 lies along the front-and-back direction (i.e. the Y direction). The pair of plate mount portions 21 is formed into a plate-like shape and extending from both widthwise edges of the board 20 toward the front side. That is, the pair of plate mount portions 21 is opposed in the left-and-right direction (i.e. the X direction). Herein, for the left-and-right direction (i.e. the X direction), a direction in which the pair of plate mount portions 21 face each other is called an inside direction, and a direction in which the pair of plate mount portions 21 face away from each other is called an outside direction.

As shown in FIG. 3, the pair of cover body mount pieces 22 is located at an upper end portion of the board 20 and is disposed in an opposed fashion at outside of the pair of plate mount portions 21. An arm portion 51 of the cover body 5 is pivotally supported by the cove body mount piece 22 in a rotatable fashion.

As shown in FIG. 3, the reflection plate 3 includes a combiner 30 and a holding member 31 having a substantially cuboid-like shape and arranged at a lower end portion of the combiner 30. The combiner 30 is a known half-mirror including a plate glass (not shown) and a light semi-permeable film (not shown) such as tin and silver evaporated on one face of the plate glass. The combiner 30 has a semi-permeability and is formed to allow the driver to see the vehicle front through the combiner 30. The reflection plate 3 is arranged to move between the protruded position at which the reflection plate 3 is protruded from the base 2 and the retracted position at which the reflection plate 3 is retracted in the base 2.

The projection unit 4 is a known liquid crystal projector which transmits light through a liquid crystal panel for projection. As shown in FIG. 1, for example, this projection unit 4 receives a control signal from a control board (not shown), thereby forms a display image such as a character and a graphic in accordance with said control signal on the liquid crystal panel composed of a plurality of liquid crystal cells, and, by illuminating the display image from back by a back light, radiates a display light L1 which corresponds to said display image.

The cover body 5 includes a cover main body 50 formed into a size for covering the opening "a" of the instrumental panel P, and the L-shaped arm portion 51 extending to the base 2 and being pivotally supported by the base 2. With the arm portion 51 being pivotally supported by the cover body mount piece 22, and an end portion of the arm portion 51 being engaged with the interlock member 23 which is supported by the later-described plate 8, the cover body 5 operates in conjunction with the interlock member 23 together with the protruding and retracting movement of the reflection plate 3, and the cover body 5 rotates from an open position to a closed position and vice versa. Herein, "open position" of the cover body 5 is meant by a position which is out of a movement pathway of the reflection plate 3 and out of a projection pathway of the projection unit 4 toward said reflection plate 3, and the term "closed position" is meant by a position in which the cover body 5 covers the front portion of the reflection plate 3 in the protruding direction.

The posture maintenance unit 6 includes the pair of plates 8 mounted to the pair of plate mount portions 21 of the base 2, respectively, a pair of positioning members 9 provided to upper end portions of the pair of plates 8, respectively, to position the reflection plate 3 (i.e. the holding member 31), and a pair of guide parts 10 provided to the holding member 31 to slidably guide the holding member 31 in the up-and-down direction with respect to the plate 8.

Figure 4:
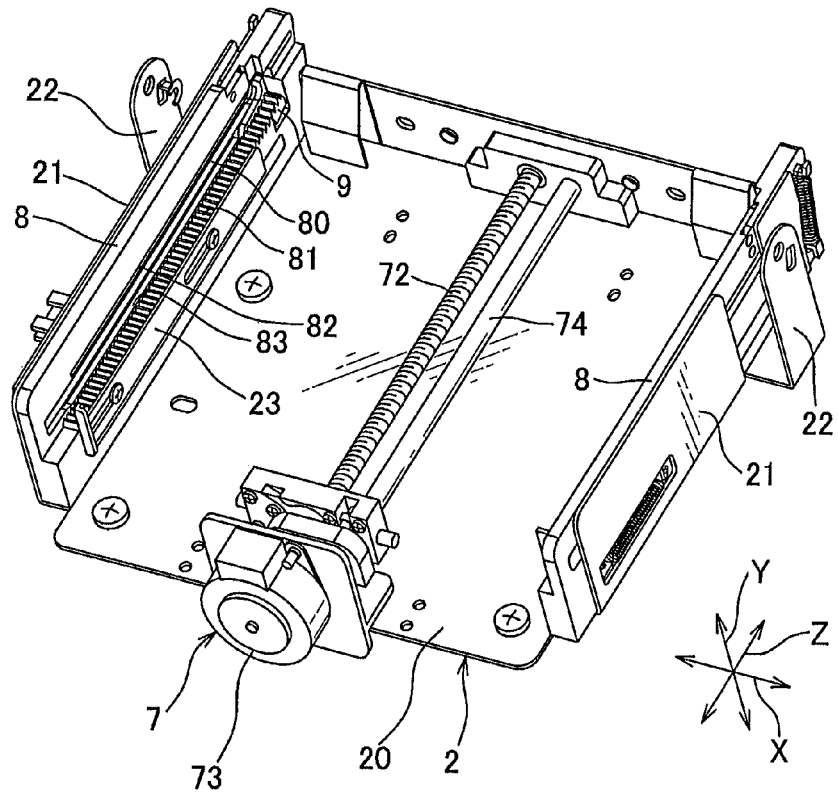
FIG. 4 is a perspective view showing a base which constitutes the vehicle display device shown in FIG. 1.
Figure 5:
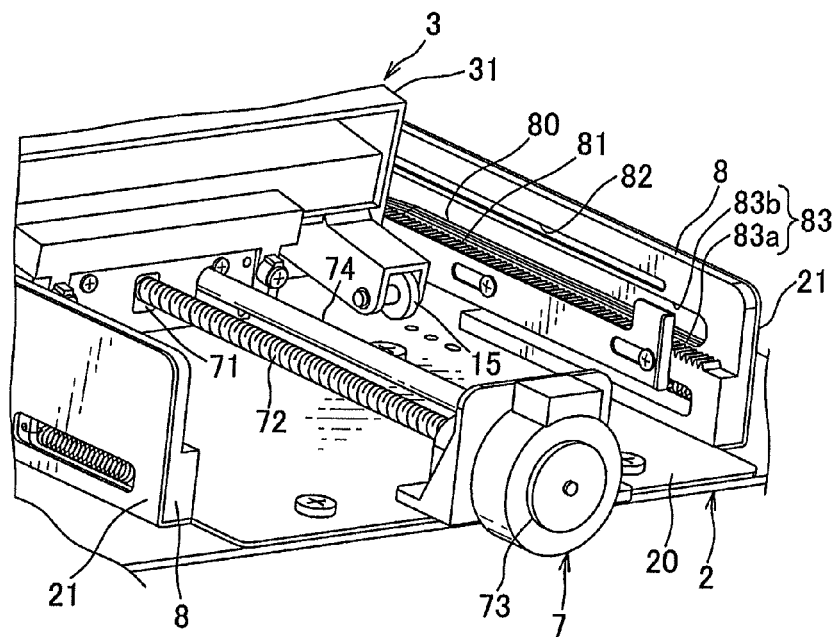
FIG. 5 is a perspective view showing the base shown in FIG. 4 and a reflection plate.

As shown in FIG. 4 and FIG. 5, the pair of plates 8 each has a rectangular shape in a planar view and is attached to an inner face of the plate mount portion 21, respectively, so the longitudinal direction of the plate 8 extends along the up-and-down direction. The respective plates 8 include a step portion which is thicker at the back side (i.e. the side adjacent to the board 20 in the Y direction) than at the front side. Each of the plates 8 includes a rail 80 extending in the up-and-down direction of the plate 8, a rack 81 formed along the rail 80 on a side of the rail 80 adjacent to the board 20, a guide groove 82 formed along the rail 80 on a side of the rail 80 distant from the board 20, and a roller receive portion 83 (i.e. a guiding portion) arranged between the rail 80 and the rack 81 along the rail 80. The width size (in the Y direction) of the guide groove 82 is formed to be equal to the outer diameter size of a later-described guide pin 13. The rack 81 is formed on a front face of the step portion (i.e. a face parallel to the inner face of the board 20) and is formed by cutting a plurality of teeth 81a. The roller receive portion 83 is provided with a pair of opposed faces 83a, 83b (shown for example in FIG. 7) which are parallel to the inner face of the board 20 and are opposed to each other. The distance between the pair of opposed faces 83a, 83b is formed to be equal to the outer diameter size of a later-described rolling roller 14.

Figure 6:
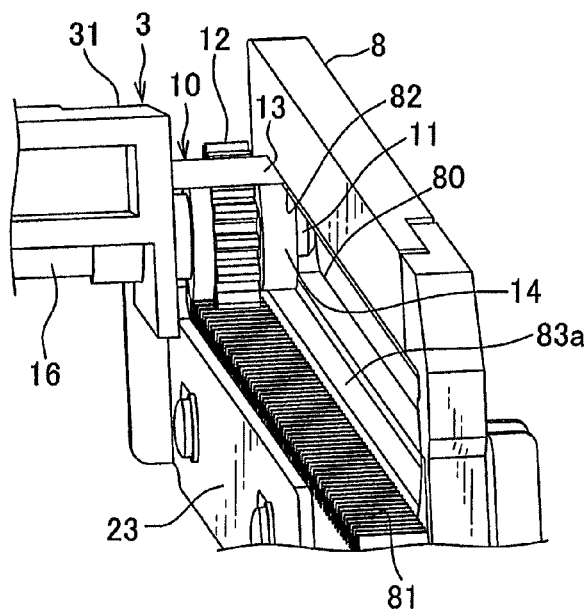
FIG. 6 is a perspective view showing a state in which a guide part of the reflection plate is guided to the base shown in FIG. 5.
Figure 7:
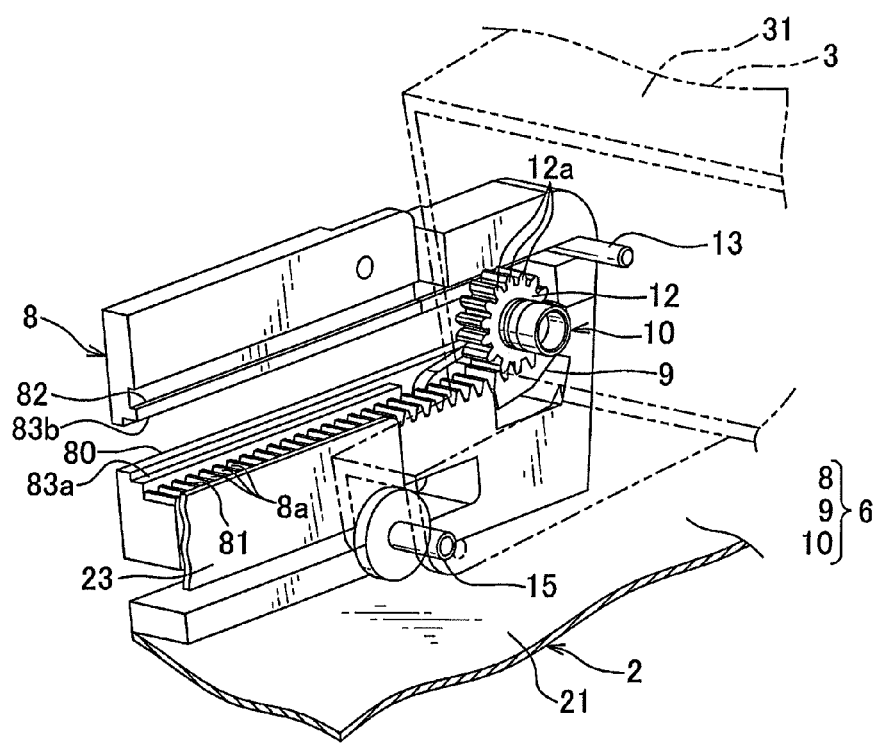
FIG. 7 is a perspective view of the vehicle display device shown in FIG. 6 seen from a different angle.
Figure 8:
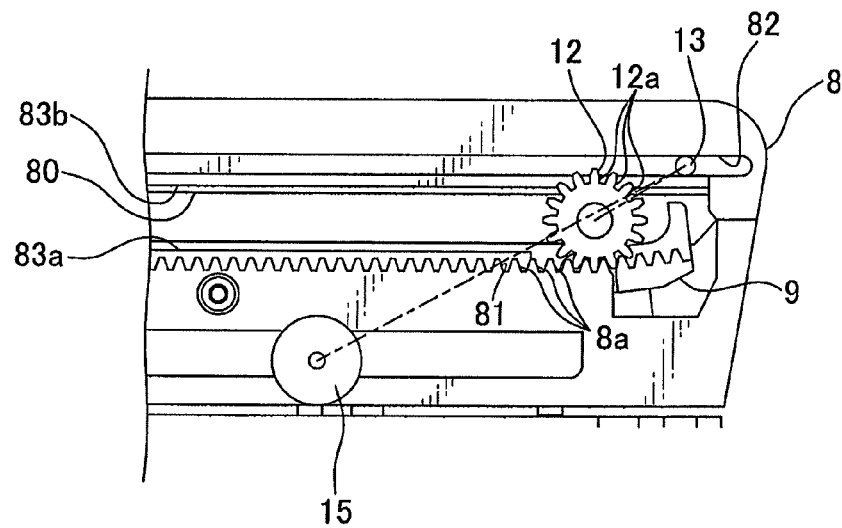
FIG. 8 schematically shows the vehicle display device shown in FIG. 7.

As shown in FIGS. 6, 7 and 8, the pair of guide parts 10 is provided at both ends of the holding member 31 in the left-and-right direction, respectively. Each guide parts 10 includes a slide portion 11 inserted into each rail 80 so as to slidably move in the rail 80, a gear 12 having a tooth 12a which engages with the teeth 81a of each rack 81, the guide pin 13 (pin) inserted into the guide groove 82 so as to slide, the rolling roller 14 arranged to roll on the opposed face 83a of the roller receive portion 83 adjacent to the rack 81, and a guide roller 15 arranged to roll on the inner face of the board 20. Furthermore, the pair of guide parts 10 is provided with a rotating shaft 16 connecting central shafts of the pair of gears 12 to each other. This rotating shaft 16 is rotatably supported by the holding member 31, and the respective gears 12 are fixed to both end portions of the rotating shaft 16, respectively. Furthermore, each of the rolling rollers 14 is rotatably supported by the rotating shaft 16 at outside of the each of the gears 12. The slide portion 11, the gear 12 and the rolling roller 14 are arranged coaxial with the rotating shaft 16. The guide roller 15 is made of rubber. The guide roller 15 is rotatably supported by the holding member 31 such that there is a gap between the holding member 31 and the inner face of the board 20. When the slide portion 11 is positioned on an upper end portion of the rail 80, the reflection plate 3 is positioned at the protruded position, and when the slide portion 11 is positioned on a lower end portion of the rail 80, the reflection plate 3 is positioned at the retracted position.

As shown in FIG. 5, the drive unit 7 includes a female screw portion 71 provided at a lower end portion of the holding member 31, a feed screw 72 threadably engaged with the female screw portion 71, a motor 73 which rotates the feed screw 72, and a rod-like guide 74 for guiding the holding member 31 in the up-and-down direction. The female screw portion 71 is formed to have an inner face penetrating through the Z direction. The feed screw 72 includes a male screw, i.e. a threaded shaft having threads on its outer face. This feed screw 72 is arranged along a surface of the board 20 of the base 2 along the up-and-down direction (i.e. the Z direction). The feed screw 72 has one longitudinal end which is non-rotatably supported by an output shaft of the motor 73 and the other longitudinal end which is rotatably supported by the holding member 31. The guide 74 is arranged parallel with the feed screw. This type of the drive unit 7 operates as below. With the male screw of the feed screw 72 and the female screw portion 71 being threadably engaged together, the feed screw 72 is rotated by the rotary drive of the motor 73, and the reflection plate 3 is moved in the up-and-down direction (i.e. the Z direction) due to the relative rotation of the male screw of the feed screw 72 and the female screw portion 71.

Figure 9:
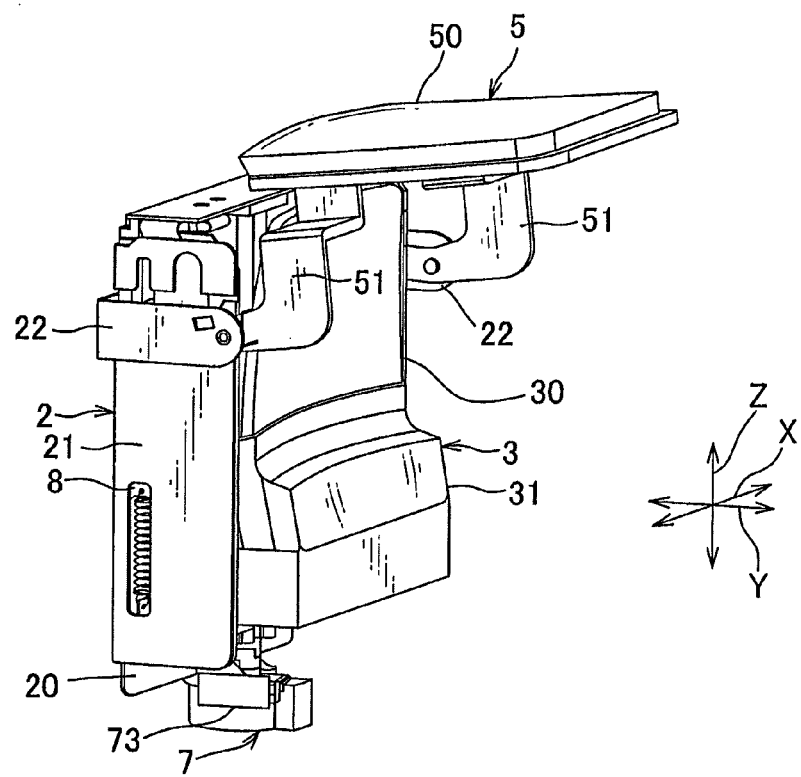
FIG. 9 is a perspective view showing the base which constitutes the vehicle display device shown in FIG. 1 and showing the reflection plate positioned at a retracted position.
Figure 10:
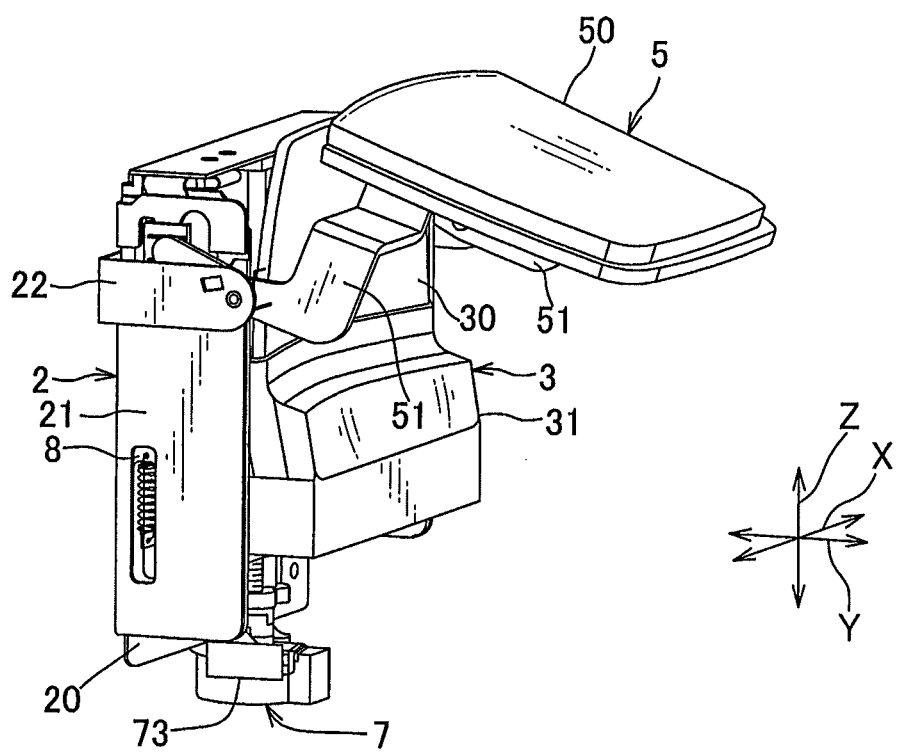
FIG. 10 is a perspective view showing a state in which the reflection plate shown in FIG. 9 being moved from the retracted position to a protruded position.

In the following, the operation of the HUD device 1 from the housed state to the in-use state is explained in reference to FIG. 7, FIG. 9, FIG. 10 and FIG. 11. As shown in FIG. 9, with the cover body 5 positioned at the closed position, the motor 73 of the drive unit 7 is driven and the reflection plate 3 is moved from the retracted position to the protruding direction (i.e. to the upper side). During the movement of the reflection plate 3, even if the reflection plate 3 is tilted toward a direction away from the board 20 (i.e. tilted forward) due to the vibration of the running vehicle and such, the gear 12 is prevented from being separated from the rack 81, because, as shown in FIG. 7, since the gear 12 is sandwiched between the rack 81 and the guide pin 13 inserted in the guide groove 82, the guide pin 13 abuts on a widthwise end of the guide groove 82 and the rolling roller 14 abuts on the opposed face 83b of the roller receive portion 83, thereby maintaining the constant distance between the gear 12 and the rack 81. As the reflection plate 3 is moved, the cover body 5 which is interlocked with the movement of the reflection plate 3 is rotated by the base 2 and positioned at the open position, as shown in FIG. 10.

Figure 11:
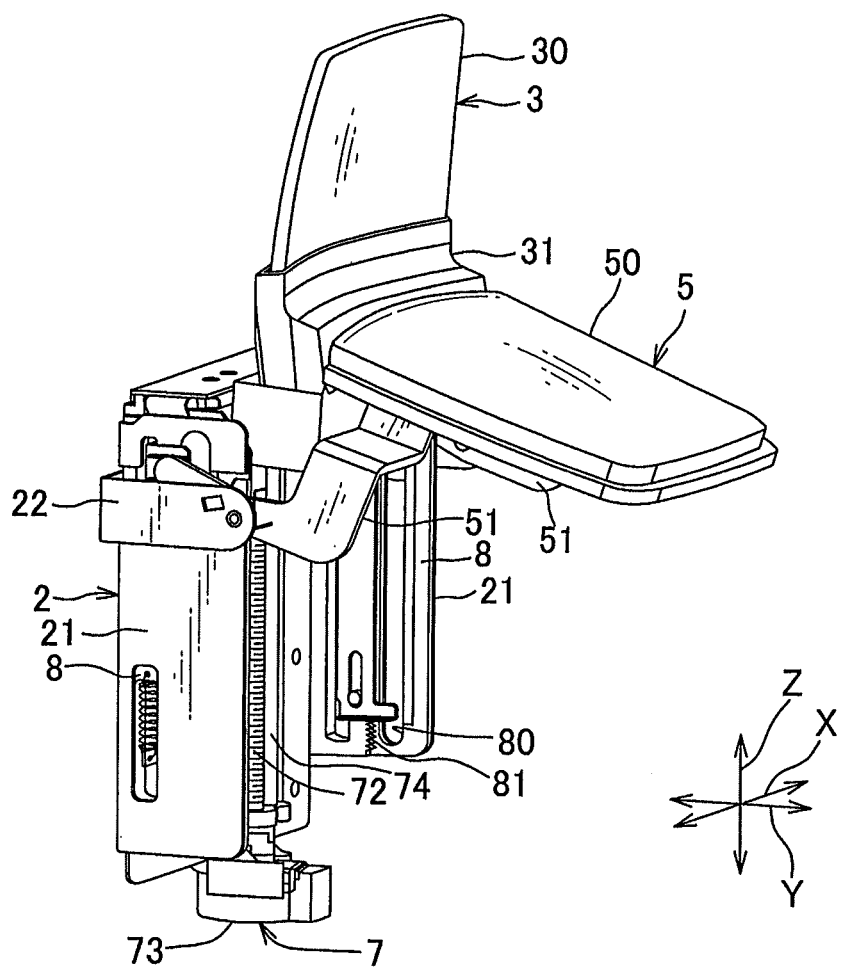
FIG. 11 is a perspective view showing the reflection plate shown in FIG. 9 positioned at the protruded position.
Figure 12:
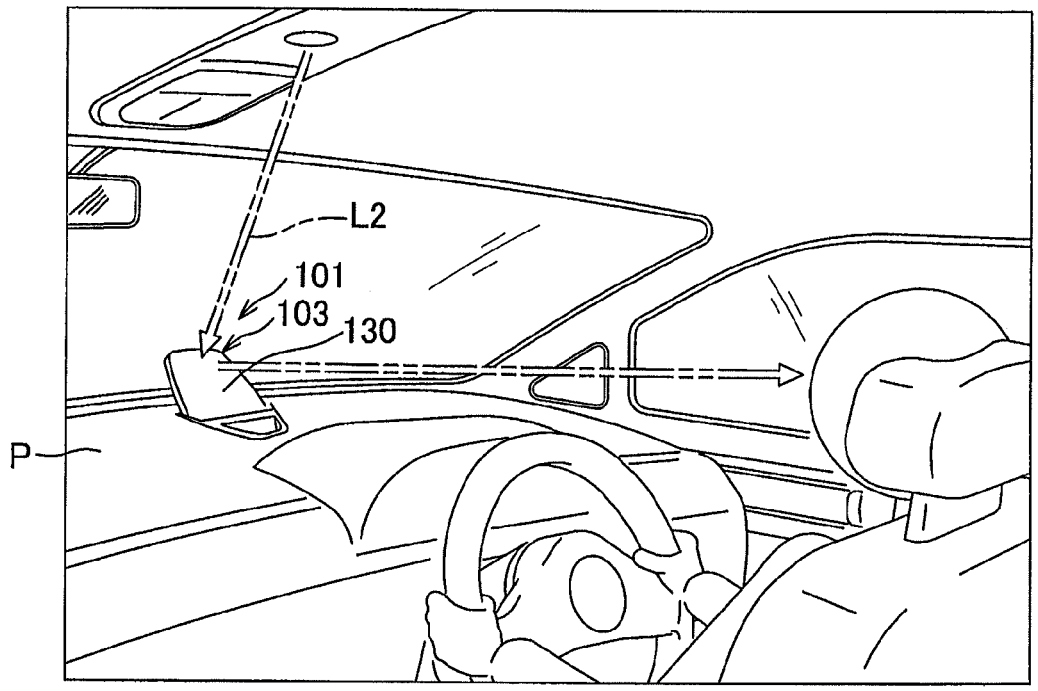
FIG. 12 is a perspective view of a room interior of a vehicle provided with a conventional vehicle display device.

Then, as the motor 73 is driven, the reflection plate 3 is moved further to the protruding direction (i.e. to the upper side), as shown in FIG. 11, and the reflection plate 3 is positioned along the tilted plane 1c by the positioning member 9. After that, the reflection plate 3 reaches to the protruded position, and the motor 73 is stopped. In this state (i.e. the in-use state), the combiner 30 displays the image formed by the display light L1 reflected on the combiner 30.

In the following, the operation of the HUD device 1 from the in-use state to the housed state is explained. As shown in FIG. 11, with the cover body 5 positioned at the open position, the motor 73 of the drive unit 7 is driven and the reflection plate 3 is moved from the protruded position to the retracting direction (i.e. to the lower side). Then, as the reflection plate 3 is moved, the cover body 5 which is interlocked with the movement of the reflection plate 3 is rotated by the base 2 and positioned at the closed position, as shown in FIG. 9. At the same time, the reflection plate 3 reaches to the retracted position, and the motor 73 is stopped. In this manner, the HUD device 1 is put to the non-use state.

For the HUD device 1 described above, the reflection plate 3 is moved so as to protrude and retract along the movement plane 1b which is tilted in the protruding direction toward the driver's eye point with respect to the orthogonal plane 1a which is orthogonal to the direction E of the line of sight to the reflection plate 3. Thus, the reflection plate 3 is moved up and down in a forward-tilted posture (that is, the reflection plate 3 is standing along the movement plane 1b) with respect the orthogonal plane 1a which is orthogonal to the direction E of the line of sight from the eye point. As a result, the external light can be prevented from being reflected on the reflection plate 3, and the driver can be prevented from feeling bright. Furthermore, in the in-use state, the reflection plate 3 is protruded from the base 2, thereby providing an impact of a novel idea of motion of the reflection plate 3, and, in the non-use state, the reflection plate 3 is retracted in the base 2, thereby preventing the reflection plate 3 from interrupting the driver's eyesight.

The embodiment described above is only a representative embodiment, and the present invention is not limited to this embodiment. That is, the present invention can be modified and implemented in various ways without departing from the gist of the present invention.

REFERENCE SIGN LIST

1 HUD device (vehicle display device)
2 base
3 reflection plate
5 cover body
6 posture maintenance unit
7 drive unit
12 pair of gears
13 guide pin (pin)
14 rolling roller
15 guide roller
16 rotation shaft
31 holding member
82 guide groove
83 roller receive portion (guiding portion)

The invention claimed is:
1. A vehicle display device comprising:
a base to be mounted to a vehicle;
a reflection plate arranged to protrude upward from the base and to retract in the base;
a projection unit arranged to project a display image on the reflection plate;
a cover body arranged to cover a front portion in a protruding direction of the reflection plate retracted in the base;
a drive unit provided to the base and arranged to drive the reflection plate to protrude and retract;
a holding member arranged to hold the reflection plate and connected to the drive unit to be driven in a linear fashion; and
a posture maintenance unit provided across the holding member and the base to maintain a posture of the reflection plate,
wherein the reflection plate is moved to protrude and retract along a movement plane which is tilted toward a driver's eye point with respect to an orthogonal plane which is orthogonal to a direction of a line of sight of a driver to the reflection plate, wherein the reflection plate is consistently tilted toward a driver's eye point with respect to the orthogonal plane, avoiding a reflection of an external light by the reflection plate in the direction toward a driver's eye point when the reflection plate is positioned at a fixed position to use and is moved to and from the fixed position.

2. The vehicle display device according to claim 1, wherein the posture maintenance unit includes:
a rack provided to the base and having a plurality of teeth;
a guide groove provided to the base along the rack;
a gear rotatably supported by the holding member and having a tooth which engages with the rack; and a pin protruded from the holding member and arranged to be guided by the guide groove.

3. The vehicle display device according to claim 2, wherein the guide groove is located closer to the projection unit than the rack, and the pin is located closer to the projection unit than the gear.

4. The vehicle display device according to claim 2, wherein the posture maintenance unit further includes:
a guiding portion provided to the base and located adjacent to the rack; and
a rolling roller rotatably supported by the holding member and arranged to roll along the guiding portion.

5. The vehicle display device according to claim 3, wherein the posture maintenance unit further includes:
a guiding portion provided to the base and located adjacent to the rack; and
a rolling roller rotatably supported by the holding member and arranged to roll along the guiding portion.

6. The vehicle display device according to claim 2, wherein the posture maintenance unit further includes a guide roller which is rotatably supported by the holding member and arranged to roll on the base.

7. The vehicle display device according to claim 3, wherein the posture maintenance unit further includes a guide roller which is rotatably supported by the holding member and arranged to roll on the base.

8. The vehicle display device according to claim 4, wherein the posture maintenance unit further includes a guide roller which is rotatably supported by the holding member and arranged to roll on the base.

9. The vehicle display device according to claim 5, wherein the posture maintenance unit further includes a guide roller which is rotatably supported by the holding member and arranged to roll on the base.

* * * * *